(12) United States Patent
Buhr

(10) Patent No.: US 10,091,324 B2
(45) Date of Patent: Oct. 2, 2018

(54) CONTENT FEED FOR FACILITATING TOPIC DISCOVERY IN SOCIAL NETWORKING ENVIRONMENTS

(71) Applicant: Tagged, Inc., San Francisco, CA (US)

(72) Inventor: Maria Helena Buhr, Menlo Park, CA (US)

(73) Assignee: THE MEET GROUP, INC., New Hope, PA (US)

( * ) Notice: Subject to any disclaimer, the term of this patent is extended or adjusted under 35 U.S.C. 154(b) by 527 days.

(21) Appl. No.: 13/833,287

(22) Filed: Mar. 15, 2013

(65) Prior Publication Data

US 2014/0040370 A1  Feb. 6, 2014

Related U.S. Application Data

(60) Provisional application No. 61/678,586, filed on Aug. 10, 2012.

(51) Int. Cl.
*H04L 29/08* (2006.01)
*H04H 60/07* (2008.01)
*H04H 60/46* (2008.01)
*H04H 60/82* (2008.01)

(52) U.S. Cl.
CPC ........... *H04L 67/306* (2013.01); *H04H 60/07* (2013.01); *H04H 60/46* (2013.01); *H04H 60/82* (2013.01)

(58) Field of Classification Search
CPC ....... G06Q 10/10; H04L 29/06; H04L 67/306; H04H 60/07; H04H 60/46; H04H 60/82
See application file for complete search history.

(56) References Cited

U.S. PATENT DOCUMENTS

| | | | | |
|---|---|---|---|---|
| 2009/0271247 A1* | 10/2009 | Karelin et al. | .................. | 705/10 |
| 2010/0131455 A1* | 5/2010 | Logan et al. | ................. | 707/602 |
| 2011/0320423 A1* | 12/2011 | Gemmell et al. | ............ | 707/706 |
| 2012/0066073 A1* | 3/2012 | Dilip et al. | ................ | 705/14.66 |
| 2015/0317398 A1* | 11/2015 | Phillips | ............. | G06F 17/30867 707/734 |

* cited by examiner

*Primary Examiner* — Nicholas R Taylor
*Assistant Examiner* — Tania M Pena-Santana
(74) *Attorney, Agent, or Firm* — Perkins Coie LLP

(57) ABSTRACT

The disclosed techniques provide systems and methods for generating content feeds with topic discovery capabilities. More specifically, various procedures are described for generating content feeds by selecting at least one of two of a first quantity of content items, a second quantity of content items, and a third quantity of content items. The first quantity of content items is selected based on a dynamically generated user interest profile associated with a particular user. The user interest profile can include a subset of first interest categories in which a specific user of a social networking system has indicated an interest. The second quantity of content items is selected based on a interest categories in which other users of the social networking system, having one or more characteristics that are the same or similar to the specific user, have indicated an interest. The third quantity of content items is selected randomly.

19 Claims, 11 Drawing Sheets

| Interest Category | Edge ID | User Action Type | Action Weight | Sentiment | Sentiment Weight | Time of Action | Temporal Relevance Weight | Frequency Weight | Total Score |
|---|---|---|---|---|---|---|---|---|---|
| Hiking | | Click | $W_A\_1$ | Sad | $W_S\_1$ | Date 1 | $W_T\_1$ | $F\_1$ | $T\_1$ |
| Outdoor | | Click (Related) | $W_A\_2$ | Happy | $W_S\_2$ | Date 2 | $W_T\_2$ | $F\_2$ | $T\_2$ |
| Music | | Post | $W_A\_3$ | Inspired | $W_S\_3$ | Date 3 | $W_T\_3$ | $F\_3$ | $T\_3$ |
| Surf | | Reaction (E.G., Repost) | $W_A\_4$ | Cool | $W_S\_4$ | Date 4 | $W_T\_4$ | $F\_4$ | $T\_4$ |

500

| INTEREST CATEGORY | EDGE ID | USER ACTION TYPE | ACTION WEIGHT | SENTIMENT | SENTIMENT WEIGHT | TIME OF ACTION | TEMPORAL RELEVANCE WEIGHT | FREQUENCY WEIGHT | TOTAL SCORE |
|---|---|---|---|---|---|---|---|---|---|
| HIKING | | CLICK | $W_A\_1$ | SAD | $W_S\_1$ | DATE 1 | $W_T\_1$ | $F\_1$ | $T\_1$ |
| OUTDOOR | | CLICK (RELATED) | $W_A\_2$ | HAPPY | $W_S\_2$ | DATE 2 | $W_T\_2$ | $F\_2$ | $T\_2$ |
| MUSIC | | POST | $W_A\_3$ | INSPIRED | $W_S\_3$ | DATE 3 | $W_T\_3$ | $F\_3$ | $T\_3$ |
| SURF | | REACTION (E.G., REPOST) | $W_A\_4$ | COOL | $W_S\_4$ | DATE 4 | $W_T\_4$ | $F\_4$ | $T\_4$ |

*FIG. 5*

| Sentiment | Pleasant / Unpleasant | Activation / Deactivation | Weight |
|---|---|---|---|
| Hot | 75 | 100 | 3.75 |
| LOL | 100 | 75 | 3.75 |
| Love | 100 | 50 | 3.5 |
| Wow! | 75 | 75 | 3.5 |
| Happy | 100 | 0 | 3 |
| Inspired | 50 | 50 | 3 |
| Hungry | 0 | 50 | 2.5 |
| Stressed | -50 | 75 | 2.25 |
| Cool | 50 | -50 | 2 |
| WTF? | -75 | 50 | 1.75 |
| Chillin' | 50 | -75 | 1.75 |
| Lame | -25 | 0 | 1.75 |
| #$?! | -100 | 50 | 1.5 |
| Ugh | -75 | 0 | 1.25 |
| Tired | 0 | -100 | 1 |
| Bored | -25 | -75 | 1 |
| Sad | -100 | -25 | 0.75 |

CONTENT FEED FOR FACILITATING TOPIC DISCOVERY IN SOCIAL NETWORKING ENVIRONMENTS

CLAIM OF PRIORITY

This application claims priority to U.S. Provisional Patent Application No. 61/678,586 entitled "Content Discovery Feed for Social Networking Environments," which was filed on Aug. 10, 2012, the contents of which are expressly incorporated by reference herein.

FIELD OF THE INVENTION

The present invention generally relates to generating content feeds (or news feeds) for users of social networking systems. More specifically, various embodiments of the present invention relate to systems and methods for generating content feeds for facilitating topic (i.e., subject matter or content) discovery in social networking environments.

BACKGROUND

Social networks in online environments are increasingly relied upon by individuals to engage and participate in various types of social activities and behaviors. Individuals use online social networks to facilitate friendly, casual, romantic, business relationships and to maintain connections and initiate dialogues with others. With the prevalence of high speed network connections to the Internet and the availability of mobile devices with wireless capabilities, the online environment has become one of the dominating mechanisms through which people communicate and connect with one another.

A content feed (or news feed) includes aggregated content items from a social networking system for display or presentation to a user of the social networking system, typically, at the user's home page. The content feed can be a continuously updated list of content items that can include, for example, stories from other users or pages that the user follows within a social networking system, status updates, photos, videos, links, application activities, and likes.

A content feed algorithm is responsible for selecting the particular content items to be included in a content feed. Today, social networking systems typically utilize one of two content feed algorithms for generating content feeds: a chronological feed algorithm or a discovery feed algorithm. Chronological feed algorithms typically select content items for a content feed based on a chronological order in which the content items occur. However, the selected content items are typically structured around topics that a user's friends or contacts are interested in rather than topics that the user is interested in. Conversely, discovery feed algorithms typically encourage content exploration based on a particular topic and thus, discovery feed algorithms typically select only content items for a content feed related to a particular topic.

Consequently, both chronological feed algorithms and discovery feed algorithms have limitations on selection of the optimal content for inclusion in a particular user's content feed.

Overall, the examples herein of some prior or related systems and their associated limitations are intended to be illustrative and not exclusive. Upon reading the following, other limitations of existing or prior systems will become apparent to those of skill in the art.

SUMMARY

This summary is provided to introduce certain concepts in a simplified form. The concepts are further described in the Detailed Description below and the drawings. This summary is not intended to identify essential features of the claimed subject matter or to limit the scope of the claimed subject matter.

The techniques introduced herein provide systems and methods for generating content feeds with topic discovery capabilities. More specifically, various procedures are described for generating content feeds (or news feed) by selecting at least one content item of two of a first quantity of content items, a second quantity of content items, and a third quantity of content items. The first quantity of content items is identified or otherwise selected based on a dynamically generated user interest profile associated with a specific user. The user interest profile can include a subset of a first plurality of interest categories in which a specific user of a social networking system has indicated an interest. The second quantity of content items is identified or otherwise selected based on a second plurality of interest categories in which other users of the social networking system, having one or more characteristics that are the same or similar to the specific user, have indicated an interest. The third quantity of content items is identified or otherwise selected randomly (including pseudo-randomly).

Accordingly, the content feed procedures described herein overcome the issues of the prior art by selecting optimal proportions of content items for a content feed associated with a particular user. The generated content feed provides the specific user with relevant content, enables the user to discover new content, and dynamically adapts to reflect the user's evolving topic preferences.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

One or more embodiments of the present invention are illustrated by way of example and not limitation in the figures of the accompanying drawings, in which like references indicate similar elements.

FIG. 5 depicts an example user interest profile for a particular user of a social networking system.

Figure 1:
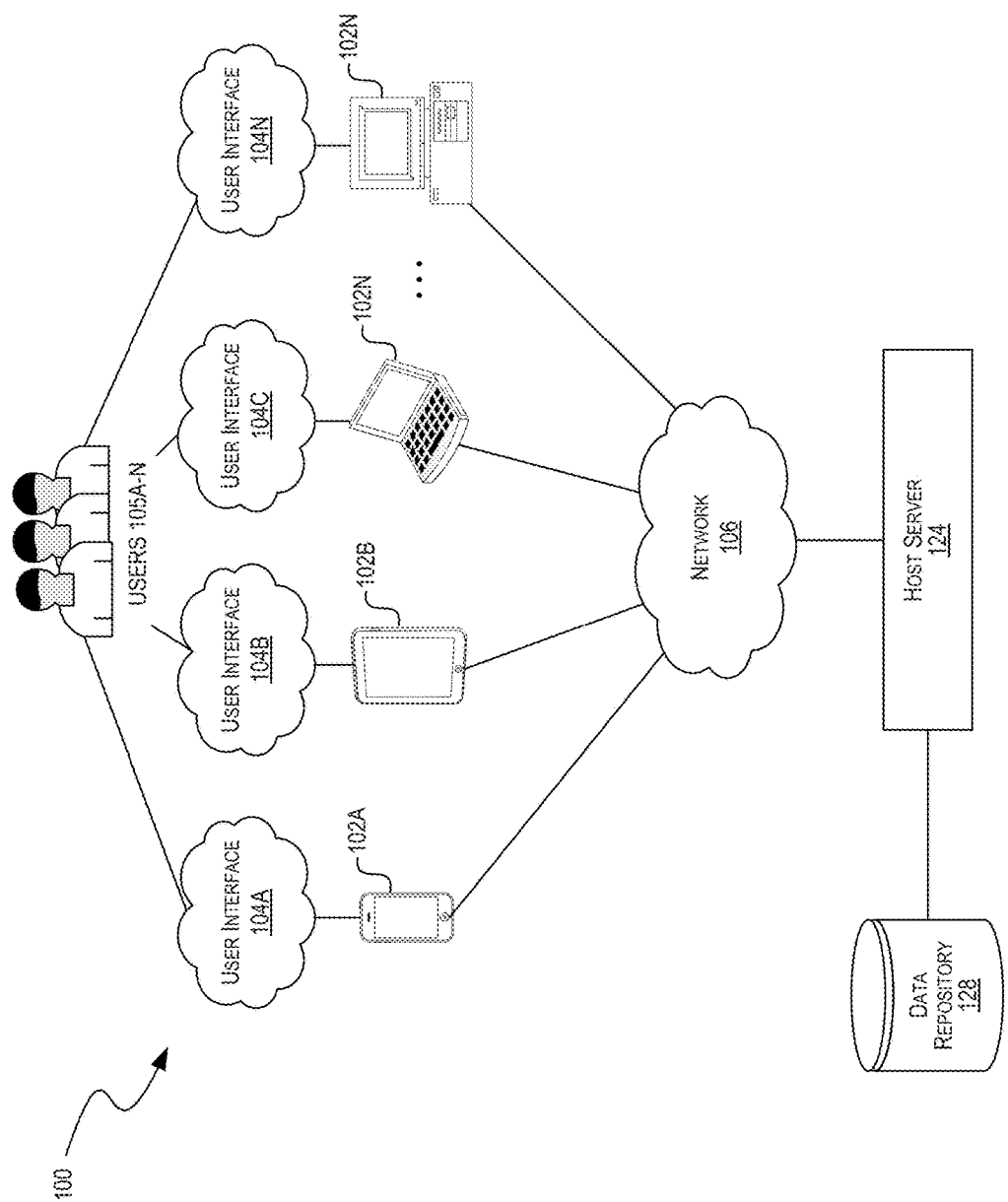
FIG. 1 depicts a block diagram illustrating an example of a networked-based environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The various embodiments of the present invention generally relate to generating content feeds (or news feeds) for users of social networking systems. More specifically, embodiments of the present invention relate to systems and methods for generating a content feed for facilitating discovery of a user's topic (or content) preferences in a web-based social networking environment. The content discovery feed provides a user with content known to be relevant to the user, enables the user to discover new content, and dynamically adapts to reflect the user's evolving topic preferences.

There are various existing content feed algorithms for generating particular types of content feeds. Unfortunately, the existing content feed algorithms have a number of limitations on selection of the optimal content for inclusion in a particular user's content feed. The content feed procedures described herein overcome the issues of the prior art by selecting optimal proportions of content items for content feeds, including various new content items for facilitating topic or interest category discovery within the social networking environment.

In one embodiment, the content feed procedures select at least one of each of a first quantity of content items, a second quantity of content items, and a third quantity of content items. The first quantity of content items is identified or otherwise selected based on a user interest profile associated with a specific user. The user interest profile can include a subset of a first plurality of interest categories in which a specific user of a social networking system has indicated an interest. The second quantity of content items is identified or otherwise selected based on a second plurality of interest categories in which other users of the social networking system, having one or more characteristics that are the same or similar to the specific user, have indicated an interest. The third quantity of content items is identified or otherwise selected randomly (or pseudo randomly).

The techniques introduced herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Although the techniques described herein are discussed with respect to a social networking system, the techniques are equally applicable to any storage and/or access system. Accordingly, the embodiments described herein are not limited to social networking systems.

TERMINOLOGY

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" or "engine" refers broadly to software, hardware, or firmware components (or any combination thereof). Modules or engines are typically functional components that can generate useful data or other output using specified input(s). A module may or may not be self-contained. An application program (also called an "application") may include one or more modules, or a module can include one or more application programs.

The terms "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Environment

FIG. 1 depicts a block diagram illustrating an example of a networked-based environment 100 in which some embodiments of the present invention may be utilized. More specifically, the networked-based environment 100 includes various client devices or user devices 102A-N able to communicate with a host (social network) server 124 for generating relevant content feeds that facilitating topic (i.e., interest category) discovery within a social networking environment. Although a single host server 124 is shown, the functionality of the host server 124 described herein can be physically and/or functionally distributed among any number of host servers.

The host server 124 is configured to facilitate an online social network for various users 105A-N. For example, when users 105A-N access their social networking accounts or user pages, the host server 124 is able to dynamically generate content feeds for the users 105A-N. The content feeds contain a plurality of content items that are selected based on one or more appropriate content feed algorithms. The content feed algorithms provide the users 105A-N with content items that the user has indicated a preference or interest in, content items other users similar to the user has indicated a preference in (e.g., recommended content items), as well as one or more additional content items that are randomly or pseudo randomly selected. In this manner the content feeds generated by the host server 124 facilitate topic (or content) discovery.

The plurality of client devices or user devices 102A-N can be any system and/or device, and/or any combination of devices/systems that is able to establish a connection with another device, a server and/or other systems. The client devices or user devices 102A-N typically include display or other output functionalities to present data exchanged between the devices to a user. For example, the client devices can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. In one embodiment, client devices or user devices 102A-N are coupled to a network 106. In some embodiments, the devices 102A-N may be directly connected to one another.

The network 106, over which client devices or user devices 102A-N and the host server 124 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc. The network 106 can be any collection of distinct networks operating wholly or partially in conjunction to provide connectivity to the client devices or user devices 102A-N and host server 124 and may appear as one or more networks to the serviced systems and devices. In one embodiment, communications to and from client devices or user devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The user data repository 128 can store software, descriptive data, images, system information, drivers, content items, and/or any other data item utilized by other components of the host server 124 and/or any other servers for operation. The user data repository 128 may be coupled to the host server 124. The user data repository 128 may be managed by a database management system (DBMS), for example but not limited to, Oracle, DB2, Microsoft Access, Microsoft SQL Server, PostgreSQL, MySQL, FileMaker, etc. The user data repository 128 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

The host server 124 is able to provide data to, and retrieve data from, the data repository 128. The user data repository 128 can store static user data and dynamic user data. The static user data can include information associated with users of the online social network. For example, static user data can include descriptive data of current and past personal information such as, but not limited to, a first name and last name of the user, a valid email ID, a unique username, age, marital status, occupations, locations lived and worked, education, home town, schools attended, number of siblings, heritage, ethnicity, race, etc. The static user data can further include interest information, which may include, but is not limited to, activities, hobbies, professional information, photos, etc.

In one embodiment, at least some of the user data stored in data repository 128 is explicitly specified by the user. For example, when the user (e.g., visitor/service subscriber) signs up for services such as social networking related services, a set of information may be required, such as a valid email address, an address of service, a valid credit card number, social security number, a username, and/or age. The user information form can include optional entries, by way of example but not limitation, location, activity, hobbies, ethnicity, photos, etc. Examples of user data stored in the data repository 128, including, but is not limited to, user name, user occupation/position, user address, subscription information, hardware ID, hardware model, software version ID, etc. The user data may be entered by a user via a profile. A user can periodically update his/her user profile which can be stored in the data repository 128. In some cases, a user's data item may include additional information about whether the user information is public and/or private. For example, the user information may include privacy information indicating what, if anything, other users of the social network can view with respect to the user data.

The data repository 128 can also store dynamic user data. Dynamic user data can either be explicitly submitted by the user or provided via one or more software agents and/or hardware modules such as the host server 124 coupled to the user data repository 128. Dynamic user data can be indicative of actions or communications initiated by a user of the social network. In one embodiment, any electronic action that a user takes within the social network comprises dynamic user data. Dynamic information or activities such as, user interactions (social interactions), relationships with other users, user connections, social records, social history records, and/or any communication records can be recorded and stored in the user data repository 128. Examples of dynamic information include, but are not limited to, indications that a user would like to meet another user, indications that a user liked something, indications that a virtual gift was sent or received, indications that a wink was sent or received, and/or indications that a user tagged another user or was tagged by another user.

In one embodiment, the data repository 128 can also store user preferences, i.e., content or interest categories in which users have expressed a specific interest or preference. The user preferences can be automatically identified by the host server and stored in the data repository 128. In one embodiment, the host server 128 essentially tracks the electronic actions that a user performs on content items within a social networking environment (i.e., user actions) and automatically processes the actions to identify a user's preferences. A user action can come in a variety of forms or types. For example, a user action can include, but is not limited to, user posts of content items (e.g., stories), user clicks of content items, and user reacts (e.g., reposts, retweets) of content items, etc. As discussed herein, content items, e.g., stories, actions, etc. are typically included in a content feed (or news feed). The user's preferences are characterized by one or more interest categories that are automatically determined by processing the content items on which the users perform actions.

The user data repository 128 is shown as a discrete component in the example of FIG. 1; however, in some embodiments, the user data repository 128 may be included in the host server 124. Additionally, in some embodiments, the user data repository and/or the host server 124 may be both physically and/or functionally distributed.

Figure 2:
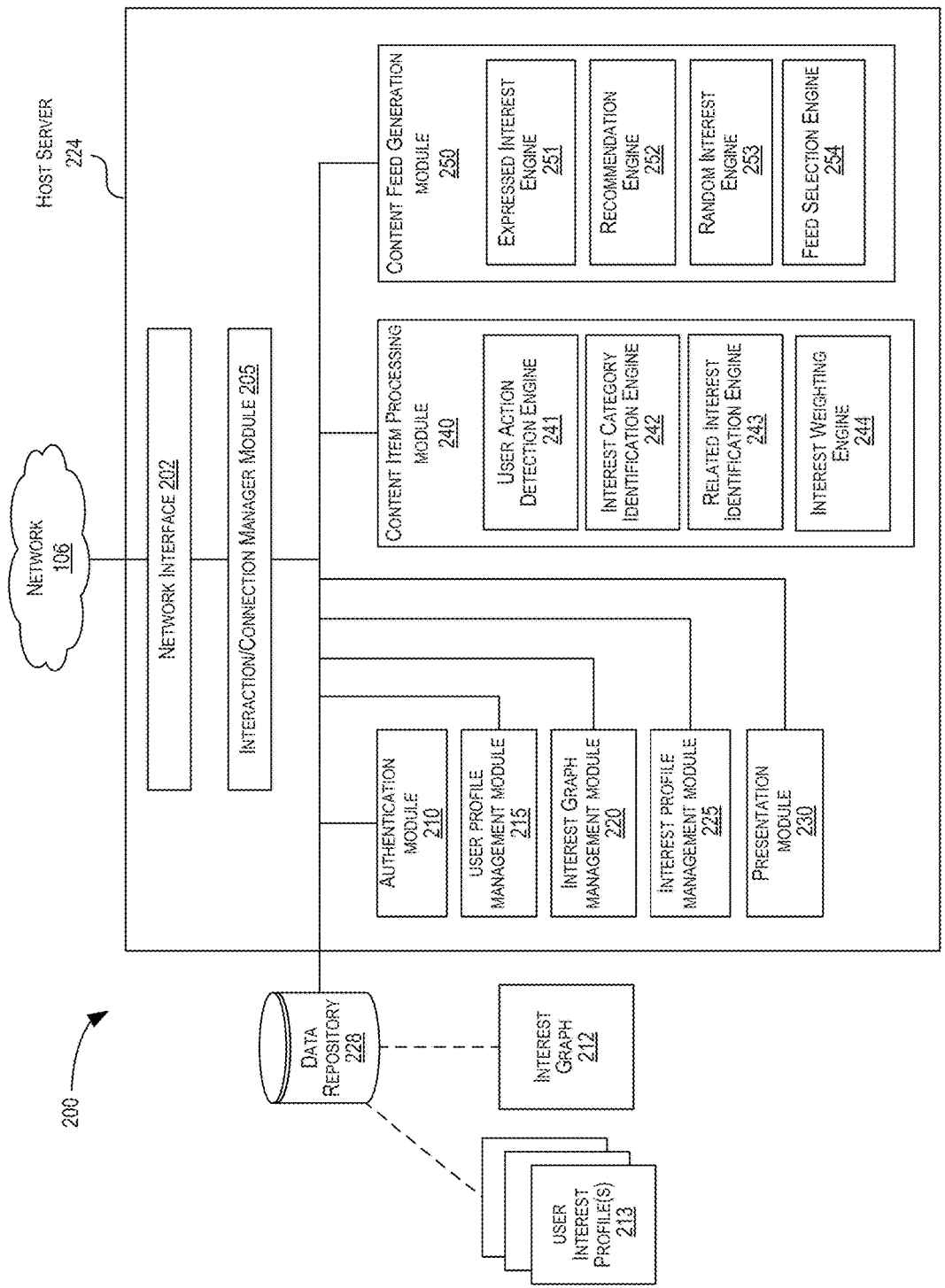
FIG. 2 depicts a block diagram illustrating example components of a host server configured to generate a news feed for facilitating content discovery in a web-based social networking environment.

FIG. 2 depicts a block diagram illustrating example components of a host server 224 configured to generate a news feed for facilitating content discovery in a web-based social networking environment 200, according to an embodiment. The host server 224 and the web-based social networking environment 200 can be the host server 124 and the networked-based environment 100 of FIG. 1, respectively, although other configurations are possible.

One embodiment of the host server 224 includes a network interface 202, an interaction/connection manager module 205, an authentication module 210, an interest graph management module 220, a presentation module 230, a content processing module 240, and a feed generation module 250. The data repository 228 can be, for example, the user data repository 128 of FIG. 1, although alternative configurations are possible. The user data repository 128 is described in greater detail with reference to the example of FIG. 1. Additional or less modules can be included without deviating from the novel art of this disclosure. In addition, each module in the example of FIG. 2 can include any number and/or combination of sub-modules and/or systems, implemented with any combination of hardware and/or software.

In the example of FIG. 2, the network interface 202 can be a networking device that enables the host server 224 to mediate data in a network with an entity that is external to the host server, through any known and/or convenient communications protocol supported by the host and the external entity. The network interface 202 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

One embodiment of the host server 224 includes the interaction/connection manager module 205. The interaction/connection manager module 205 can be any combination of software agents and/or hardware modules able to identify, detect, track, manage, record, and/or process an occurrence of an interaction, an action, a relationship, an existing connection, and/or a requested connection.

The interaction/connection manager module 205, when in operation, is able to communicate with the network interface 202 to identify and detect and/or receive data items including, but not limited to, a set of social interactions or social connection that occurred among multiple users in an online social network. In general, the social interactions that occurred in the online social network are initiated by users using client devices or user devices (e.g., a cell phone, a telephone, a SmartPhone, a PDA, an iPhone, a Blackberry, a computer, a laptop, and/or a Palmtop, etc.). Any type of connections or interactions can be detected and subsequently tracked and/or received and/or recorded for further processing and analysis. The types of connections/social connections can include relationships of various types (e.g., friendship, collegial, family, romantic, gaming, etc.) or relationships/connections of unspecified types. A connection in an online social network generally refers to users who have requested and accepted a connection request and are thus mutually connected.

The interactions/actions that occur in an online social network can include by way of example, but not limitation, sending or receiving an invitation to establish a social connection in the social network, sending or receiving a message, viewing a profile, posting a comment, posting information, joining a group, sending or receiving an invitation to an event or party, belonging to a group, creating a group, etc. The interaction/connection manager module 205 records these actions and determines the sender and recipient of these actions. If the action pertains to a group, the interaction/connection manager module 205 also determines and stores the associated group.

In one embodiment, the social interactions detected by the interaction/connection manager module 205 also includes sending a notification of interest, receiving a notification of interest, and/or responding to a notification of interest. For example, a notification of interest may be sent to a relevant user identified for a particular user when the particular user has indicated interest. The relevant user may respond to the notification if also interested in the particular user. Note that the notifications of interest sent to the particular user may be anonymous or non-anonymous. More specific examples of notifications of interest can include, but are not limited to, indications that a user would like to meet another user, indications that a virtual gift was sent or accepted, indications that a wink was sent or accepted, and/or indications that a user tagged another user. These interactions (also referred to as actions herein) are also tracked by the interaction/connection manager module 205.

In one embodiment, the interaction/connector module 205 determines the date/time of the occurrence of the event and stores the timestamp associated with the occurrence. The date and/or time associated with the occurrence of the event can be used in the comparison of content items and in the generation of one or more weights associated with the content items.

One embodiment of the host server 224 includes the authentication module 210. The authentication module 210 can be any combination of software agents and/or hardware components able to manage and register users of host server 224. For example, the authentication module 210 is configured to register new users with the system and/or create new accounts with the host server 224. During registration the user can provide, among other things, login credentials. The authentication module 210 is configured to authenticate the users as they access the host server 224 from a variety of devices. In some embodiments, authentication occurs by associating a user's username and password with an existing user account. Unauthorized users can be directed to register with the system.

One embodiment of the host server 224 includes the profile management module 215. The profile management module 215 can be any combination of software agents and/or hardware components able to control and manage modifications to user profiles. For example, a user can periodically update his/her user profile which can be stored in the user data repository 128. The user profile can include a variety of personal information describing the user. Some of this information can be public information that other users can view and some of the information can be private. Likewise some information in a user's profile may be viewable to some users but not to others. For example, social connections or friends of the user may be able to view the user's profile while non-social connections are not able to view the user's profile.

One embodiment of the host server 224 includes an interest graph management module 220. The interest graph management module 220 can be any combination of software agents and/or hardware components able to generate, update, control, access, and/or otherwise manage an interest graph 212. In one embodiment, the interest graph 212 can be a bi-partite graph that includes a plurality of interest categories each interconnected with one or more of a plurality of users of the social network by edges. The edges can include edge information indicating one or more weights that together indicate a measure of user interest in a particular interest category. In one embodiment, the interest graph management module 220 interacts with the interest scoring module 225, the content item processing module 240, and/or the content feed generation module 250 to provide and update information related to interest graph 212.

One embodiment of the host server 224 includes an interest profile management module 225. The interest profile management module 225 can be any combination of software agents and/or hardware modules able to access, update, and/or generate user interest profiles 213. The user interest profiles 213 are dynamic. Triggers to update/generate a user interest profile 213 may be received by a content feed generation module in response to the request to generate (i.e., select content items for) a content feed. Alternatively or additionally, the content item processing module can dynamically trigger the interest profile management module to update after the processing module 240 detects and processes a user action. That is, a particular user interest profile 213 can be updated responsive to being needed for the selection of new content items for a content feed and/or responsive to the detection of a new user preference by the system.

In one embodiment, when an update is triggered, the interest profile management module 225 receives a particular user as input and accesses an interest graph via the interest graph management module 220 to determine the interest categories associated with the particular user and the corresponding edge information. As discussed above, the edge information can include one or more weights that can be combined into a total score or a total weight. The interest categories associated with the highest scores or weights are considered the most relevant. In one embodiment, the interest profile management module 225 selects a subset of the interest categories based on the corresponding scores or weights. The number of interest categories selected in the subset for inclusion in the interest profile 213 can be predetermined by the system (e.g., preset to 10, 20, etc.).

In some embodiments, keywords can be used to represent each interest category. In this case, the subset of information associated with the particular user can include a list of the top scoring keywords (e.g., top 10 keywords or top 20 keywords). As discussed below, the scoring can be triggered dynamically each time the content item processing module 240 detects and/or otherwise identifies a new user action performed on a content item. Alternatively or additionally, the scoring can be triggered dynamically by the content feed generation module 250 prior to content item (or feed) selection. Once scoring is complete, the subset of information is stored in an interest profile 213 associated with the particular user. An example interest profile 213 is shown and discussed in greater detail with reference to FIG. 5.

One embodiment of the host server 224 includes a presentation module 230. The presentation module 230 can be any combination of software agents and/or hardware modules able to present and/or otherwise send a content feed to a client device for electronic presentation to a user. In one embodiment, the presentation module 230 is coupled to the feed generation module 250 and the data repository 228. As discussed above, a user device may be, for example, a computer, laptop, cell phone, Blackberry, iPhone, etc. The content feed includes various content items. The content items can be images, and/or textual information, etc.

One embodiment of the host server 224 includes a content item processing module 240. The content item processing module 240 can be any combination of software agents and/or hardware modules able to process content items on which user actions have been performed in order to identify and score associated interest categories. In the example of FIG. 2, the content item processing module 240 includes a user action detection engine 241, an interest category identification engine 242, a related interest identification engine 243, and an interest weighting engine 244. An example process illustrating content item processing is discussed in greater detail with reference to FIG. 8.

In one embodiment, the content item processing module 240 includes the user action detection engine 241. The user action detection engine 241 is configured to detect, identify, and/or otherwise determine when a user has performed an action on a particular content item. The user actions may be first tracked and stored in the data repository 228 and then scanned by the user action detection engine 241. Alternatively or additionally, the user action detection engine 241 can receive actions as they come in (e.g., directly from the interaction/connection manager module 205).

In one embodiment, the content items processing module 240 includes the interest category identification engine 242. The interest category identification engine 242 is configured to process a content item on which a particular user has performed an action (e.g., post, repost, click, etc.) in order to identify interest categories associated with the content item. For example, the interest category identification engine 242 can parse a text-based content item to identify various keywords. As discussed above, each interest category can be represented by a keyword. In some instances, tags can be used to parse non text-based content items.

In one embodiment, the content items processing module 240 includes the related interest identification engine 243. The related interest identification engine 243 is configured to expand on the various keywords explicitly identified by the interest category identification engine 242 by identifying additional related keywords. As discussed below, the related keywords can be associated with lesser weights than the explicitly identified keywords.

In one embodiment, the content item processing module 240 includes the interest weighting engine 244. The interest weighting engine 244 is configured to determine and apply one or more weights to the interest categories. An example of the possible weights is shown and discussed in greater detail with respect to FIGS. 5 and 6.

One embodiment of the host server 224 includes a content feed generation module 250. The content feed generation module 250 can be any combination of software agents and/or hardware modules able to generate content feeds for the users of the social network. In the example of FIG. 2, the content feed generation module 250 includes an expressed interest engine 251, a recommendation engine 252, a random interest engine 253, and a feed selection engine 254. An example process illustrating content feed generation is discussed in greater detail with reference to FIG. 7.

In one embodiment, the content feed generation module 250 includes the expressed interest engine 251. The expressed interest engine 251 is configured to access a user interest profile associated with the user for which a content feed is being generated to identify the particular user's preferences. The preferences are then used to select and/or rank content items. The highest ranking content items are selected and presented to the user. In one embodiment, once a content item (e.g., news story) has been selected and presented in a content feed, it is marked for exclusion to ensure that the same content item is not presented in the same content feed multiple times to the same user. However, content feeds with updated comments may be—in some instances—considered new content items and/or unmarked. Further, content items that are older than a specific date can be excluded. The exclusion date can be dynamically selected by the system and/or preset by an administrator, and/or configurable by a user.

As discussed above, the user interest profile includes the most relevant (highest scoring) user preferences in the form of interest categories. Content items in the data repository 228 can be processed to identify interest categories associated with the content items. The content items can then be selected based on relevance (e.g., when the content item is associated with one or more interest categories included in the user interest profile). For example, an interest category can be represented by a key word "hiking." If a content item is related to hiking and/or contains the word hiking, then the content item may be selected for the content feed. Each content item can have one or more associated weights in the user interest profile. The one or more weights associated with the content items can be used to determine which content item to select for the content feed. That is, a content item having multiple keyword matches may be ranked higher. Additionally, as discussed herein, some keywords have higher weights than others.

In one embodiment, content items can be selected for the content feed with a probability that is proportional to the weight of the interest category (or key word). For purposes of simplicity, assume that a user is associated with two interest categories (in this case, key words): hiking with total relative weight of 80 and dogs with relative weight of 20. In this case, a content items (e.g., stories) about hiking will be selected with 80% probability and a content item about dogs will be randomly selected with a 20% probability.

In one embodiment, content items (e.g., stories) that have been previously selected for display in the content feed are excluded and those content items that are older than a specified period (e.g., older than 30 days) are excluded. If the search for content items that the user has expressed an interest in returns a set that is smaller than a first predetermined quantity (e.g., 6 of 10) then the host server can utilize the recommendation engine 252 to make up this deficit. Likewise, if the search for content items that other users' of the social network that have the same or similar characteristics to the specific user (e.g., share one or more of the same interests as the specific user) have expressed an interest in returns a set that is smaller than a second predetermined quantity (e.g., 3 of 10 plus any deficit of the first predetermined quantity), then the host server can utilize the random interest engine 253 to select content items and make up the deficit(s) or differences. In some embodiments, the random logic is used when there are not enough results to populate the news feed using the expressed logic. Alternatively or additionally, in some embodiments, the system may want to use one or more recommended results.

In one embodiment, the content feed generation module 250 includes the recommendation engine 252. The recommendation engine 252 is configured to access an interest graph 212 to select content items based on interest categories in which other users of the social networking system have indicated an interest. The other users have one or more characteristics that are the same or similar to the specific user.

For example, for each batch or set of ten stories, the host server may select a subset of stories (e.g., 3 stories) that are recommended. For each user, the system first constructs or accesses an interest graph. The host server then identifies the interest categories that a specific user (i.e., user A) has expressed an interest in. For example, user A may be associated with a "sports" interest category and a "music" interest category. The host system then identifies other users that have the same or similar characteristics. In this case, the other users also like "sports" and "music." The recommendation engine 252 determines that these other users that like "sports" and "music" also like "fashion" and "dancing." Accordingly, the recommendation engine 252 selects (recommends) three stories about "fashion" and/or "dancing."

In one embodiment, the content feed generation module 250 includes the random interest engine 253. The random interest engine 253 is configured to randomly select content items. This is a good way to expand the interest graph and potentially learn more about users without overwhelming the users with content items that they are not interested in. The random content items can be selected from content items that have been published within a specified time period (e.g., the last week). Additionally, content that has already been selected for the content feed can be omitted. Thus, all content items that have not been previously selected for the content feed have an equal probability of being selected by the random interest engine 253.

In one or more embodiments, the specified time periods, number of keywords, predetermined set size, etc., can be dynamically chosen by the host server, set by administrators, and/or configured by users of the web-based social networking system. Further, the actual layout of the feed displayed to the user can depend on the how users react to content (e.g., number of reacts to a story may result in a larger footprint in the content feed).

New system users will have an empty interest graph if they have not yet submitted a post, clicked on a post, or reacted to a post. In some embodiments, an new user content feeds are generated with content items selected from a group of content items having the most associated user actions (e.g., posts, reacts, clicks, etc.), although alternative configurations and variations are possible.

In one embodiment, the content feed generation module 250 includes the feed selection engine 254. The feed selection engine 254 is configured to select optimal proportions of the content items for user content feeds.

Figure 3:
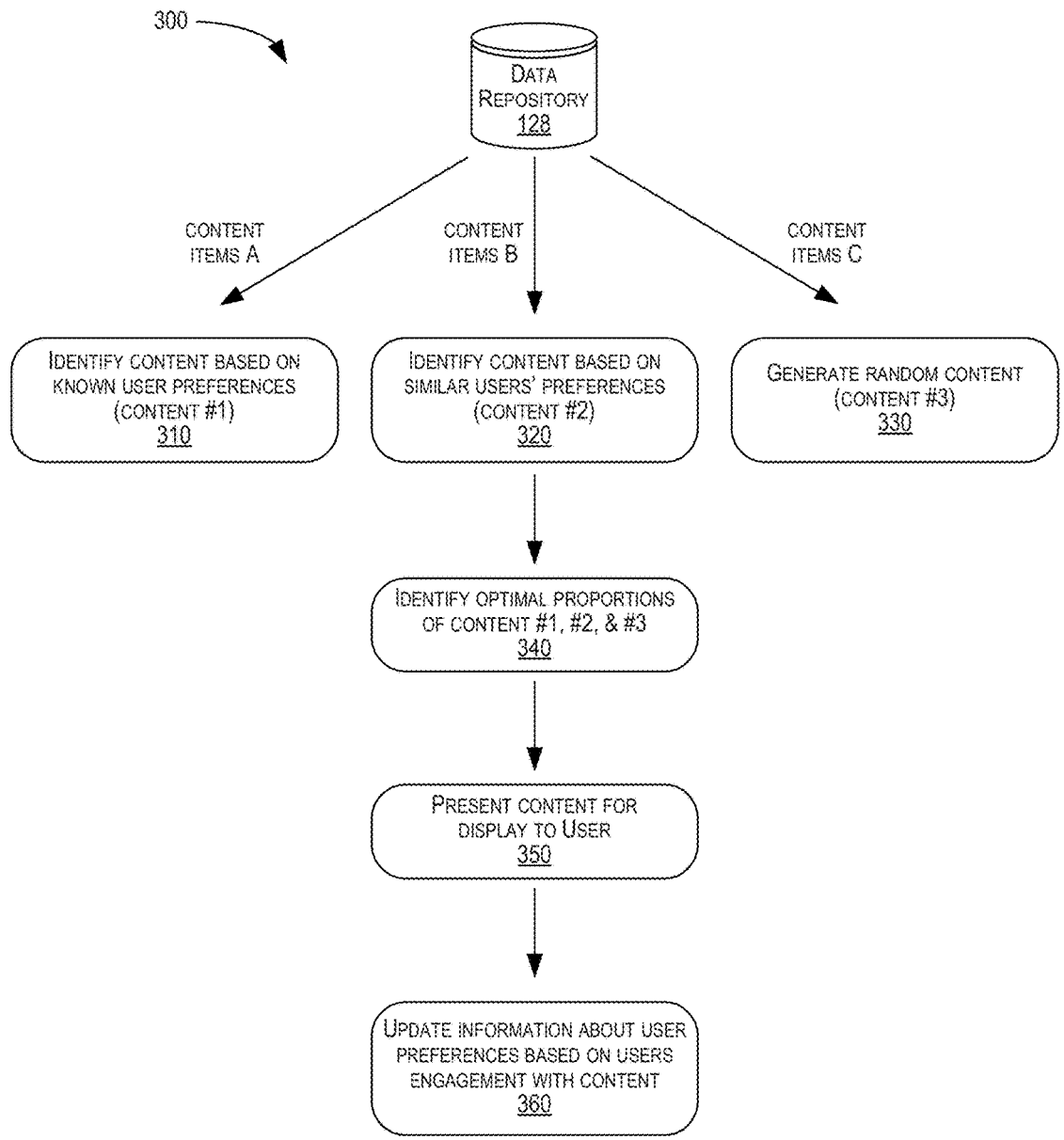
FIG. 3 depicts a diagram illustrating content data flow for updating information about a user's preferences in web-based social networking environment.

FIG. 3 depicts a diagram illustrating content data flow 300 for updating information about a user's preferences in web-based social networking environment, according to an embodiment. The various data flow operations illustrated in FIG. 3 may be performed in various embodiments by one or more host servers 124 of FIG. 1, one or more processors, and/or other modules, engines, components or tools discussed herein. Additional or fewer data flow operations are possible.

As shown in the example of FIG. 3, the generated content feed utilizes several factors or logics to select the appropriate content for a user. For example, the first logic can select content that includes topics that the user has previously expressed direct interest in. The second logic can select content with topics that are related to topics that the user expressed interest in. The third logic can select a random topic from the user-topic graph. Accordingly, by utilizing the three logics, the content discovery feed disclosed herein provides the user with a dynamic customized feed which can result in dynamic discovery of a user's evolving topic preferences while also providing the user content that is known to be relevant.

The content feed can be constructed to optimize a user's social discovery experience. For example, by assembling content with the different logics, the proposed content feed balances the benefits/drawbacks of the different methods and achieves a better feed than could otherwise be obtained by any of the individual logics. The content discovery feed offers both content that the system knows that the user prefers and content the system knows that the user still has not seen and/or expressed opinions about. By exposing the user to some topics that the user has not seen before, the user can discover new topics and the system can quickly learn about the user's evolving preferences.

Figure 4:
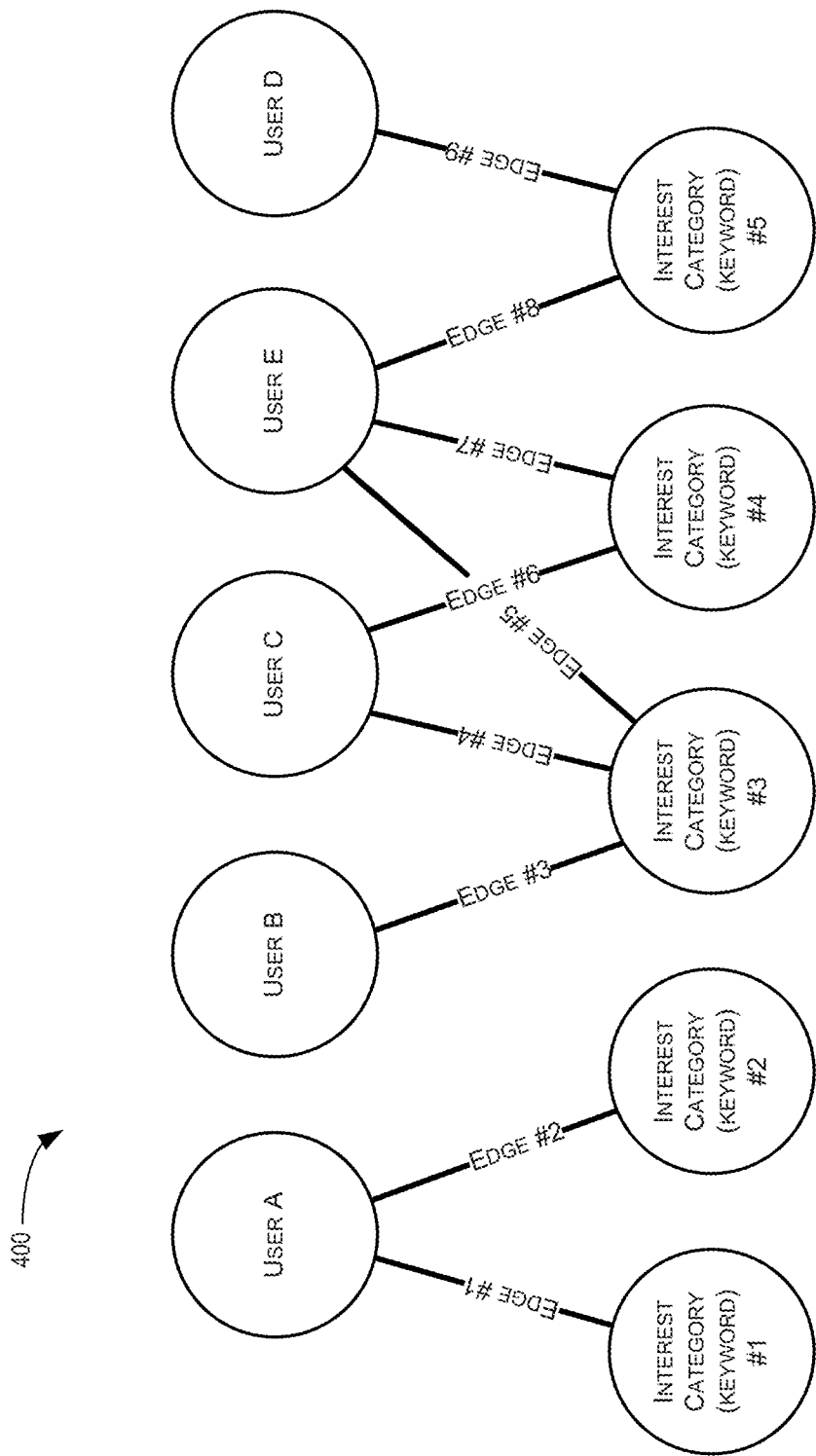
FIG. 4 depicts a diagram illustrating an example bipartite user-topic (or content) graph used by the system to model and/or track social networking system user's dynamic and/or evolving content preferences.

In one embodiment, each user of a social network is situated in a bipartite graph of users and topics (see example FIG. 4). Each user is linked to topics that he has expressed an interest in. Thus, when a user interacts with content in the content feed generated for the user, the user-topic bipartite graph is also updated to track the user's topic preferences.

In one embodiment, a content (or news) feed can be generated from various types of content: (1) content that the system knows the user prefers, (2) content the system believes the user will prefer, and (3) content the system has randomly selected for the user. Additionally, in some embodiments, the system will choose optimal portions of each type of content for the news feed. The resulting content items can be pushed out to a content feed in a set of any number of content items (e.g., stories or content). For example, in one embodiment, the results of the news feed are pushed out in sets of ten. In one embodiment, the system may adjust or otherwise dynamically select the set size based on the user's interaction with the previous set and/or prior sets. In one embodiment, the first ten results (e.g., news stories) are the results with the highest relevance.

In one embodiment, once a content item (e.g., news story) has been displayed in a news feed, it is marked for exclusion to ensure that the same content item is not presented in the news feed to the user multiple times. However, news feeds with updated comments may be—in some instances—considered new content items and/or unmarked. Further, data items that are older than a specific date can be excluded. The exclusion date can be dynamically selected by the system and/or preset by an administrator, and/or configurable by a user.

In one embodiment, additional weight can be given or applied to specific content (e.g., content that is more likely to be important to the user).

Referring again to FIG. 3, to begin data flow 300, content 1-3 is identified. Content 1 is defined as "expressed" content or content that the system knows that the user is interested in. Content 2 is defined as "recommended" content or content that helps the user to discover things that are related to things the user expressed interest in (e.g., neighboring topics in an interest graph). Content 3 is defined as "random" content or content the will allow the user to discover new things.

In process 310, content 1 is based on known user preferences (e.g., from previous posts and/or clicks). The first logic can select content that includes topics that the user has expressed direct interest in such as, for example, the first order topic neighborhood in the user-topic graph of FIG. 2. Accordingly, the user will see content that focuses on topics that he/she has expressed an interest in. However, if content 1 is the only content utilized in the content feed, then the user would not have any opportunity to explore new topics and the system could not learn about new topic preferences other than the preferences that were given when the system was generated/the user entered the system. In the example of FIG. 2, content 1 is any content that includes topics 1 and/or 2.

In one embodiment, the system will identify a number of top keywords (e.g., top 20 keywords) for each user. Each keyword that a user expressed interest in has a weight which can depend on a number of factors. For example, the weight can depend on: (1) the frequency of the keyword occurring (e.g., being used in posts by the user and/or being used in post clicked on by the user, etc.), (2) the time since the keyword was last used, and/or the (3) the sentiment attached to the keyword (e.g., happy, sad, etc.). For each user, the top keywords are used to get stories related to those keywords to identify content of type 1. In some embodiments, the system has a specified number of content 1 type stories that it wants to identify in a set. If the system cannot identify the specified number of content 1 type stories, then it will attempt to identify additional content 2 type stories, if possible. For example, if the system wants to identify 6 of 10 stories of type 1, 3 of 10 stories of type 2, and 1 of 10 stories of type 3, and can only identify 5 type 1 stores, then the system will attempt to identify 4 type 2 stories instead of 3.

In process 320, content 2 is identified. Content 2 is based on content based on similar user preferences. The second logic can select content with topics that are related to the topics that the user has explicitly noted that he/she prefers such as, for example, the topics on the second order topic neighborhood in the user-topic graph. This logic works as a recommendation system that introduces the user to topics that he is likely to prefer. This logic enables discovery of new topics; however, discovery can be a slow process. Nonetheless, if the user is only exposed to content in his second order neighborhood, it can take many iterations (potentially infinite—if the graph has multiple components) until he is exposed to topics in other regions of the user-topic graph. In the example of FIG. 2, content 2 is any content that includes topic 3. That is, user A's preference includes topic 2, and according to FIG. 2, user's that are interesting in or like topic 2 (e.g., user B) also like topic 3.

For example, if a user A expresses interest in sports and music (e.g., type 1) and other people (e.g., user B) who like sports and music also like fashion and dancing, then the system will create display posts about fashion and dancing to user A.

In process 330, content 3 is identified. Content 3 is based on a random selection of content in the system and/or database. The third logic can select one or more random topics from the user-topic graph. In this manner, the system can quickly learn about a user's preferences for topics in other areas of the user-topic graph (topics outside the first and second order neighborhood). However, this content is more likely to be irrelevant to the user. In the example of FIG. 2, content 3 is any content that includes topics 1-5; although, in some embodiments, the system may refrain from selecting content of type 1 and/or type 2 during the random selection process.

In process 340, at least two of the content 1-3 is combined and optimal portions of the content determined. By assembling content with at least two logics, the system provides for efficient discovery of a user's topic preferences while still displaying content that is relevant for the user. The user-topics graph (e.g., of FIG. 2) that supports the content generation will be updated as the user interacts with the content. This provides for a highly dynamic system that quickly learns about user's evolving preferences.

In process 350, the optimal portions of the content are presented to a user device for display to the user in a generated content feed. In some instances, the user may interact with the optimal portions of the content. In this case, the system detects the interaction with the content by the user, and in process 360, updates information about the user preferences based on the user's engagement with the content. The system can model and/or track a social networking user's dynamic and/or evolving content preferences based on the users' engagement with the content. An example of modeling and/or otherwise tracking users' preferences based on their engagement of content items is discussed in greater detail with reference to FIG. 4.

FIG. 4 depicts a diagram illustrating an example interest graph 400 that can be used by the system to model and/or track a social networking user's dynamic and/or evolving interest preferences, according to an embodiment. Additionally, the user's interest preferences can be used to develop a user interest profile as discussed in FIG. 5.

As shown, the interest graph 400 includes a plurality of interest category nodes #1-#5 each interconnected with one or more of a plurality of user nodes A-E by edges #1-#9. As discussed above, each edge can include edge information indicating one or more weights that together indicate a measure of user interest in a particular interest category. In one embodiment, the interest graph 400 is a bi-partite graph.

As discussed with respect to FIG. 3, three distinct logics can be used to select content to present and/or otherwise provide to a user device for display. The content from the three logics is aggregated into a content feed for a selected user. As the selected user interacts with content in the feed (e.g. clicks on content), the user-topic graph is updated with new information about the user's dynamic or evolving content preferences. As shown in this example, interests (i.e., interest categories) are represented by interest category nodes #1-5 and users are illustrated by user nodes A-E. The user nodes A-E have direct connections (i.e., edges) to the topics that they have express an interest in (e.g., by posting or re-posting a content item associated with a particular topic represented by an interest category and/or by clicking on posts associated with a particular topic represented by the interest category, etc.).

FIG. 5 depicts an example user interest profile 500 for a particular user of a social networking system, according to an embodiment. The user interest profile 500 can be one of the interest profiles 213 of FIG. 2; although alternative configurations are possible.

In one embodiment, the host system accesses and processes information contained in an interest graph such as, for example, interest graph 400 of FIG. 4 to generate a user interest profile for a particular user. An interest profile for a particular user can include a subset of the interest categories for which the particular user has expressed an interest. In one embodiment, the quantity of interest categories in the interest graph 400 can be predefined. For example, the system may select a quantity of twenty of the highest-rated interest categories associated with a particular user for inclusion in the particular user's profile.

In one embodiment each interest category can be represented by a keyword. The interest graph 400 can be processed with respect to a particular user to identify all of the keywords in which the particular user has expressed an interest and the associated edge information. As discussed above, the edge information can include one or more weights that can be utilized to score the keywords and/or otherwise identify the most relevant subset of keywords. The subset of keywords (i.e., the keywords in the user interest profile) can then be used by the content feed algorithm to select the appropriate content items for the particular user (i.e., content items associated with and/or including keywords from the subset of keywords). An example of such a process is shown and discussed in greater detail with reference to FIG. 11 and FIG. 12.

As shown in the example of FIG. 5, the user interest profile 500 includes an interest category column, an edge identifier (ID), column, a user action type column, an action weight column, a sentiment column, a sentiment weight column, a time of action column, a temporal relevance weight column, a frequency weight column, and a total score column. More or fewer columns are possible.

In one embodiment, content items are selected for inclusion in a content feed for a particular user in relative importance to the score(s) associated with each of the interest categories. For example, a set of interest categories (e.g., key words) associated with a content item (e.g., story) that a user posts, clicks, or reacts to are first extracted. A content items may be reacted to by a user if, for example, the user re-posts or re-tweets the content item. Each interest category that a user expresses interest in has one or more associated weights which can depend on one or more factors. For example, if the interest categories are represented by keywords, then the one or more associated weights can depend on: (1) the frequency with which the keyword occurs in a content item; (2) the time since the keyword occurred (or was used) in the content item; (3) the sentiment attached to the keyword or content item, etc.

In one embodiment, for each user, the system will identify a number of top keywords (e.g., 20 top keywords). The system will then identify stories related to those key words. The most relevant or highest-rated identified stories are then used to generate content 1 (i.e., expressed content). For example, if a set of 10 stories are to be used in the feed, then six of the stories may be stories in which the user expressed an interest.

Keywords from a user's post can be weighted different than keywords from a story the user merely clicks on. For example, keywords from a user's post may be weighted with a value of "10" while keywords from another user's post that the user merely clicks on may be weighted with a value of "1." Similarly, keywords from reacts may have a different weight as well, for example, reacts may have a weight of "5."

Additional "extracted" keywords related to the original keywords may also be used to expand the interest graph for a user. The "extracted" or related keywords can be of higher level or lower level categories. A higher level "extracted" or related keyword can be more generic than the original identified keyword. For example, "dog" is a higher level keyword (generic keyword) for "poodle." Another related keyword for "dog" may be "pet." The related keywords can be weighted differently by the system than the original keywords. Furthermore, the related keywords may be weighted differently than other related keywords based on the level (e.g., higher or lower level related keywords). In some embodiments, the weight of the "extracted" or related keywords may be set to one-half the original weight.

Figure 6:
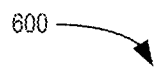
FIG. 6 depicts an example illustrating various weights corresponding to sentiments that can be associated with particular content items.

In one embodiment, a sentiment can be extracted from a content item (e.g., post or story) and applied a weight. FIG. 6 illustrates an example of sentiment weighting, according to an embodiment. In some embodiments, the sentiment weight is multiplied by the weight of the keyword (i.e., user action weight) and/or the temporal relevance weight and/or other possible weights to determine the final weight or score applied to the interest category.

As discussed above, in one embodiment, a temporal relevance weight is multiplied with the user action weight (also called a click/post weight), and the sentiment weight to determine a final weight for the key word (interest). In one embodiment, the temporal relevance weight is determined by the following equation: temporal relevance weight=$1/(\log(2+(\text{days since post}))$. In other embodiments, the relevance weight can be specified using a different equation or algorithm.

One Example of Operation

In one example, a first user A posts one story: "I'm hiking" (attached sentiment=happy, time of post='2012-02-02'), and clicks on two stories: "I love music" (attached sentiment=love, time of post='2012-02-01') and "would love to go hiking" (attached sentiment=sad, time of post='2012-02-02').

From these posts and clicks, the host server or system constructs user A's interest graph on 2012-02-02.

Weight for Hiking=10(post)*3(sentiment score for happy)*
$1/\log(2+0)$(for time)+1(click on hiking)*
0.75(sentiment score for sad)*$1/\log(2+0)$(for time)=
99.65+2.49=102.14.

Weight for Outdoor=5(term related to hiking)*
3(sentiment)*$1/\log(2+0)$(for time)=49.82.

Weight for Music=1(click)*3.5(sentiment)*$1/\log(2+1)$(for time)=7.34.

Weight for Hiphop=0.5(term related to click)*
3.5(sentiment)*$1/\log(2+1)$(for time)=3.67.

The host server then populates the content feed using the expressed logic, the recommended logic, and the random logic. In this example, for a batch or set of ten stories, the system first selects six expressed content (type 1) stories that the first user A has expressed an interest in. The following steps are subsequently performed.

For each user, the system constructs an interest graph. Alternatively or additionally, interest graphs can be constructed for a plurality of users. The system subsequently determines the top interest categories (e.g., top 20 key words) as defined by the weights of the key words. As discussed, each key word has a weight. A first type of content item (i.e., stories) for the content feed are then selected with a probability that is proportional to the weight of the key word. For purposes of simplicity, assume that a user has two keywords: hiking with weight 80 and dogs with weight 20. In this case, a random story about hiking will be selected with 80% probability and a story about dogs will be randomly selected with a 20% probability.

As discussed, stories that have been previously selected for display in the content feed are excluded and those stories that are older than a specified period (e.g., older than 30 days) are excluded. If the query (search for content the user has expressed an interest in) returns a set that is smaller than six stories, then the system can use the recommended logic to make up the difference. In some embodiments, the random logic is used when there are not enough results to populate the news feed using the expressed logic. Alternatively or additionally, in some embodiments, the system may want to use one or more recommended results.

The recommended logic (type 2) is content generated with a recommendation system. For each batch or set of ten stories, the system may select a subset of stories (e.g., 3 stories) that are recommended. For each user, the system first constructs an interest graph. The interest graph may already be constructed in some cases. The system then determines that the first user A has expressed an interest in, for example, sports and music, and determines that other people that like sports and music also like fashion and dancing. Accordingly, the system selects three random stories about fashion and/or dancing. The selection may be completed as follows. For the top keywords (e.g., top 20 keywords) based on the user's interest graph, the system finds interests that people tend to like if they like the top 20 keywords. The results are then ordered and ranked so that the top three ranking results can be selected. If the query (search for content to be recommended to the user) returns a set that is smaller than the selected three stories, then the system can add content using the random logic.

The random logic (type 3) is content that is drawn from the list of content that has been published within a specified time period (e.g., the last week). This excludes content that has already been selected for the feed and displayed to the user. All stories that have not been previously selected for the feed and displayed to the user have an equal probability of being selected for the feed in the random logic.

In one or more embodiments, the time periods, number of keywords, set size, etc., can be dynamically chosen by the system, set by administrators, and/or configured by individual users. Further, the actual layout of the feed displayed to the user can depend on the how user reacts to content (e.g., number of reacts to a story).

New system users will have an empty interest graph if they have not yet submitted a post, clicked on a post, or reacted to a post. In some embodiments, a new user feed is generated. The new user feed may include those posts with the most reacts, for example; although alternative configurations and variations are possible.

FIG. 6 depicts an example sentiment table 600 illustrating various weights corresponding to sentiments that can be associated with particular content items. When a user of the web-based social networking environment generates, clicks on, and/or otherwise reacts to a content item, the user can be provided with an option to add a sentiment to the content item. The sentiment table 600 is generally self-explanatory.

Various Methods for Topic Discovery

Figure 7:
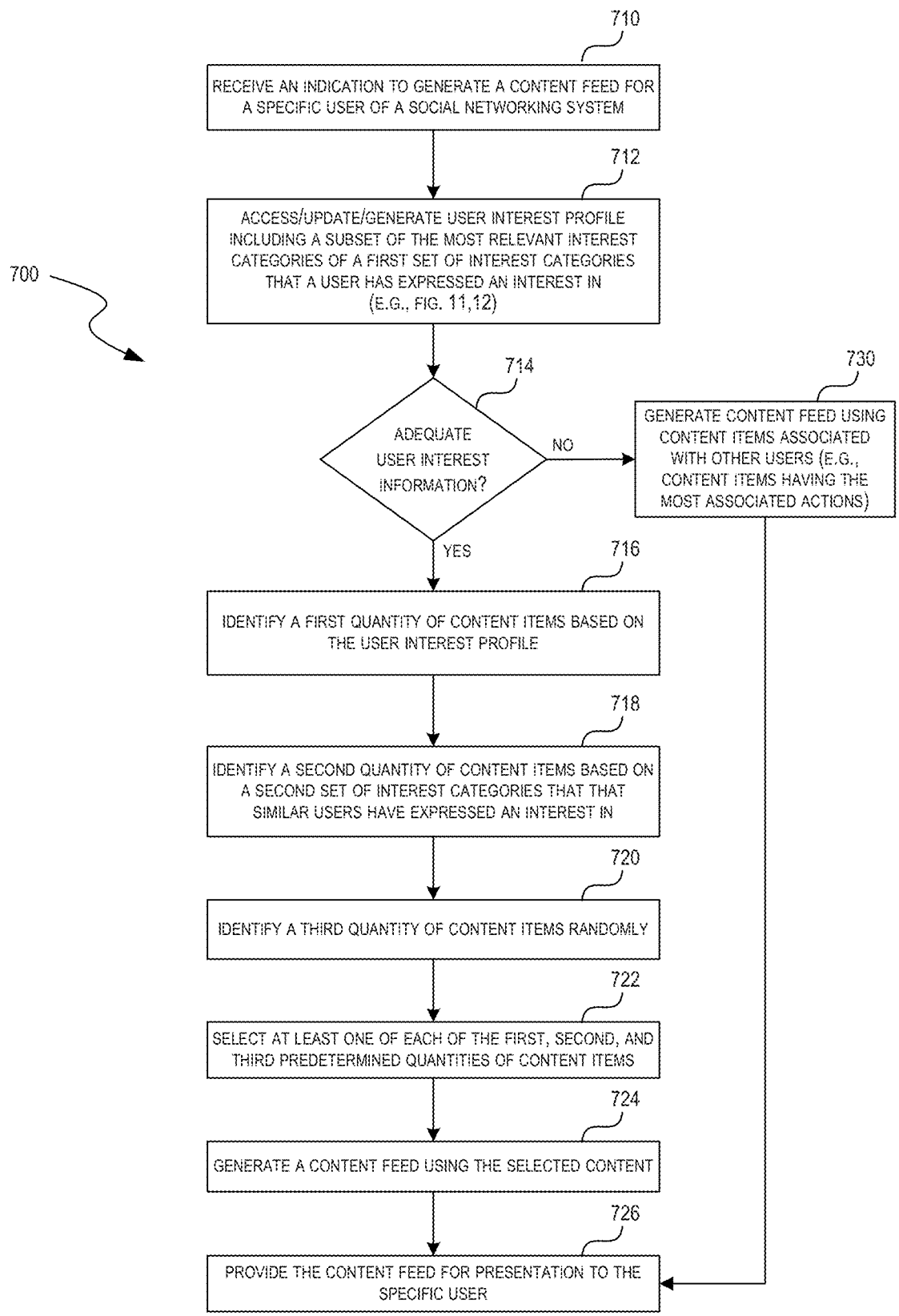
FIG. 7 depicts a flowchart illustrating an example process for selecting content items to be included in a content feed for a particular user.

FIG. 7 depicts a flowchart illustrating an example process 700 for selecting content items to be included in a content feed for a particular user and providing the content feed to the user, according to an embodiment. The operations illustrated with respect to FIG. 7 may be performed in various embodiments by a host server of FIG. 1, one or more processors, and/or other modules, engines, components or tools discussed herein. Additional or fewer data flow operations are possible.

To begin, at step 710 the host server receives an indication to generate a content feed for a specific user of a social networking system. The indication may be generated by the host server in response to a user directly or indirectly requesting that new content items be selected for a dynamic content feed associated with the user. The request for new content items can be generated or received in response to a user accessing his/her home page. Alternatively or additionally, the request for new content items can be generated or received in response to the user scrolling beyond a threshold of the content items currently selected for the content feed (i.e., the content feed needs more content items for display to the particular user).

At step 712, the host server accesses a user interest profile associated with the particular user. As discussed above, a user interest profile includes a subset of the most relevant interest categories of a first set of interest categories in which a user has expressed interest. Additionally, the host server may optionally update the interest profile upon receiving the indication to generate the content feed for the specific user or, alternatively, generate the interest profile if it does not exist.

At a decision step 714, the host server determines whether the user interest profile includes adequate user interest information. If the user interest profile does not include adequate user interest information then, at step 730, the host server generates content feed using content items associated with other users. For example, if a user is new to the system (i.e., the system has not yet had a chance to identify user content preferences), then the initial content items selected for the user can be those content items having the most associated actions (e.g., most clicks, posts, reposts).

However, if the user interest profile does include adequate user interest information then, at step 716, the host server identifies a first quantity of content items based on the user interest profile. For example, the content items may be processed to identify content items in the social networking system that match one or more of the subset of the first set of interest categories. As discussed above, the interest categories in a user profile can be represented by a subset of (e.g., most relevant) keywords. In this case, the content items in the database can be processed to determine which ones match the subset of interest categories.

At step 718, the host server identifies a second quantity of content items based on interest categories in which other users of the social networking system have indicated an interest. For example, a recommendation engine such as, for example, recommendation engine 252 of FIG. 2 can access an interest graph and select content items based on interest categories in which other users of the social networking system have indicated an interest. As discussed above, the other users can have one or more characteristics that are the same or similar to the specific user.

At step 720, the host server identifies a third quantity of content items randomly as described herein.

At step 722, the host server selects at least one of the first, second, and third quantities of content items. The host server attempts to select the content items from the first, second, and third quantities of content items such that the content items selected from the first quantity of items is greater than the content items selected from the second quantity of items is greater than the content items selected from the third quantity of items. In one embodiment, the host server attempts to select predetermined proportions of the first, second, and third quantities of content items. For example, for every ten content items, the host server may attempt to select six based on known user preferences, three based on similar users' preferences, and one randomly.

At step 724, the host server generates, updates, and/or otherwise populates the content feed with the selected content items. Lastly, at step 726, the host server provides the content feed for presentation to the specific user (e.g., the user visiting his/her home page within the social networking environment).

Figure 8:
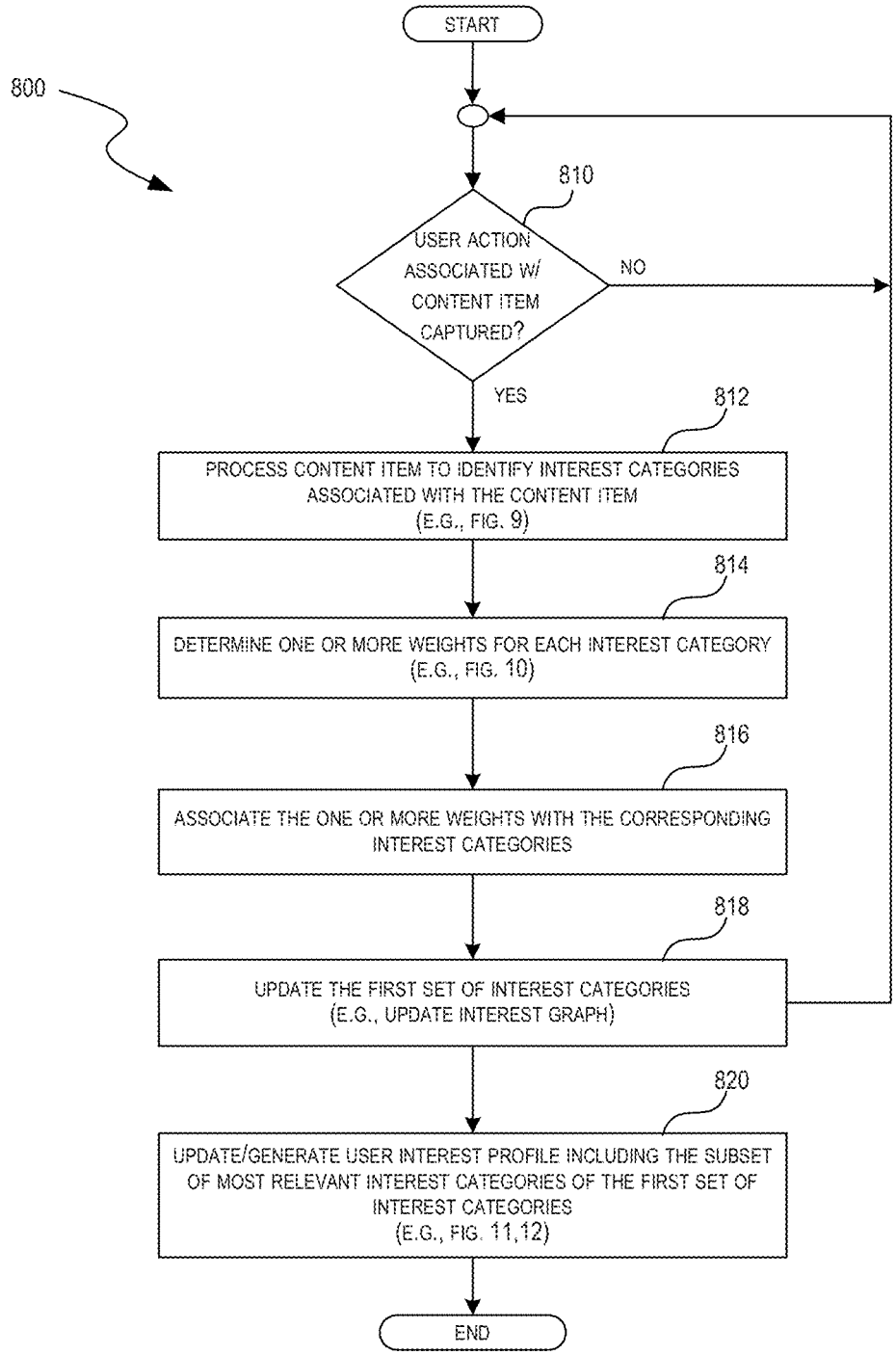
FIG. 8 depicts a flowchart illustrating an example process for updating or generating a set of interest categories in which a specific user has expressed an interest.

FIG. 8 depicts a flowchart illustrating an example process for updating or generating a set of interest categories in which a specific user has expressed an interest. The operations illustrated with respect to FIG. 8 may be performed in various embodiments by a host server of FIG. 1, one or more processors, and/or other modules, engines, components or tools discussed herein. Additional or fewer data flow operations are possible.

To begin, at a decision step 810, the host server determines if a user action associated with a content item is captured and/or otherwise received. If so, at step 812, the host server processes the associated content item to identify interest categories associated with the content item. An example of identifying interest categories associated with a content item is shown and discussed in greater detail with reference to FIG. 9.

At step 814, the host server determines one or more weights for each interest category. For example, as discussed with reference to FIG. 5, each category can include one or more of an action weight, a sentiment weight, a temporal relevance weight, a frequency weight, and a total score or weight. An example of determining one or more weights for an interest category is shown and discussed in greater detail with reference to FIG. 10. At step 816, the host server associated with one or more weights with the corresponding interest categories and, at step 818, the host server updates the first set of interest categories. Steps 816 and 818 can consist of updating the interest graph including updating and/or creating new interest category nodes and/or updating and/or creating edge information.

Lastly, at step 820, the host server optionally updates the user interest profile associated with the user that performed the action on the content item that was captured. As discussed above, a user interest profile can be updated after each new content item on which the user performs an action is processed. Alternatively or additionally, the user interest profile can be updated in response to a request to generate a content feed.

Figure 9:
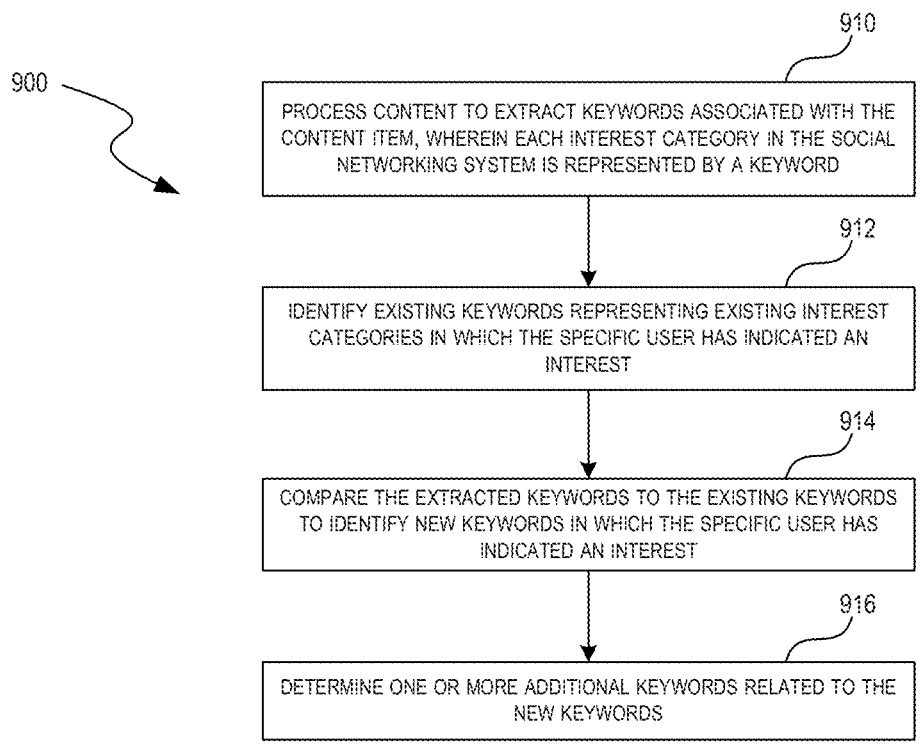
FIG. 9 depicts a flowchart illustrating an example process for processing a content item to identify one or more associated interest categories.

FIG. 9 depicts a flowchart illustrating an example process 900 for processing a content item to identify one or more associated interest categories, according to an embodiment. More specifically, example process 900 illustrates processing a text-based content item to identify one or more keywords associated with the content item. The operations illustrated with respect to FIG. 9 may be performed in various embodiments by a host server of FIG. 1, one or more processors, and/or other modules, engines, components or tools discussed herein. Additional or fewer data flow operations are possible.

To begin, at step 910, the host server processes a content item to extract one or more new keywords associated with the content item. In this example, each interest category is represented by a keyword. At step 912, the host server identifies existing keywords representing existing interest categories. The existing keywords can be accessed via the interest graph. At step 914, the new keywords are compared to the existing keywords to determine which keywords are already stored in the interest graph as user preferences. Lastly, at step 916, one or more additional keywords related to the new keywords are determined (e.g., by a related interest identification engine 243 of FIG. 2).

Figure 10:
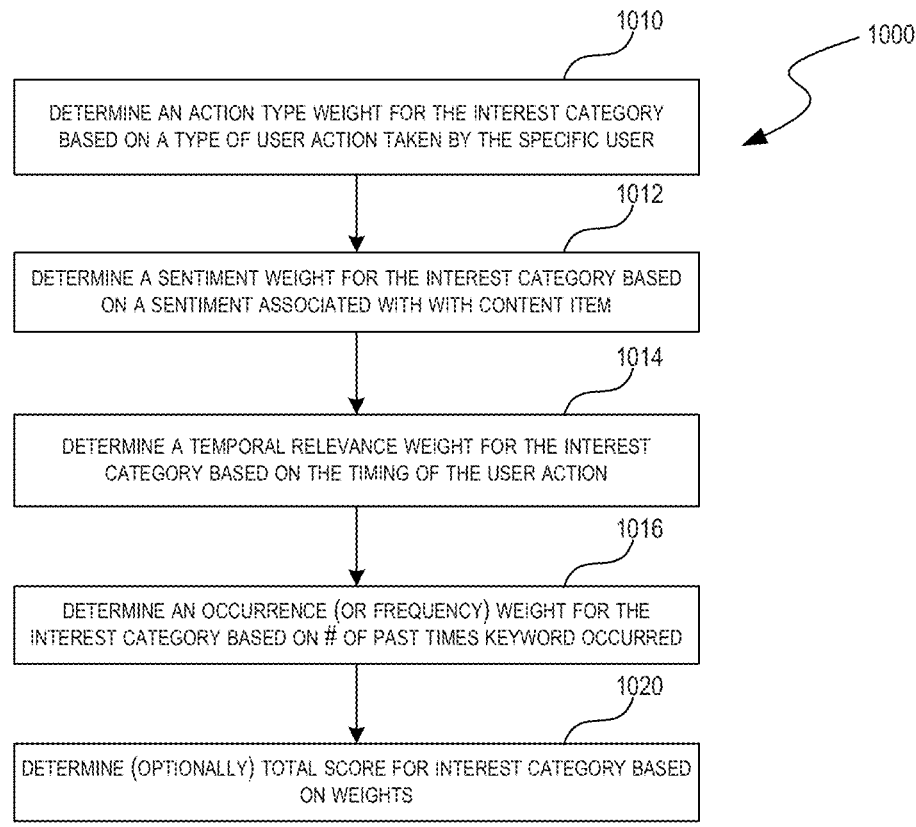
FIG. 10 depicts a flowchart illustrating an example process for determining one or more weights associated with an interest category.

FIG. 10 depicts a flowchart illustrating an example process 1000 for determining one or more weights associated with a particular interest category, according to an embodiment. The operations illustrated with respect to FIG. 10 may be performed in various embodiments by a host server of FIG. 1, one or more processors, and/or other modules, engines, components or tools discussed herein. Additional or fewer data flow operations are possible.

To begin, at step 1010, the host server determines an action type weight for the interest category based on a type of user action taken by the specific user on the content item with which the interest category was derived. For example, the user may have posted, reposted, clicked on, etc. the content item having the associated interest category. Each user action (e.g., posted, reposted, clicked, etc.) can have a different weight that is associated with the interest category. At step 1012, the host server determines a sentiment weight for the interest category based on a sentiment associated with the content item and/or a sentiment associated with the action. For example, when a user posts a message, the user can attached a corresponding sentiment (e.g., happy, sad, etc). Examples of the various sentiments are shown and discussed in greater detail with reference to FIG. 6.

At step 1014, the host server determines a temporal relevance weight for the interest category based on the time of the user action. For example, the number of days since the action occurred can be taken into account when determining the relevance of interest categories. In one embodiment the temporal relevance can be determined from an equation that decreases as the number of days since the action occurred increases (e.g., temporal relevance=$1/\log(C+D)$, where C is a predetermined constant and D is the days since the action occurred).

At step 1016, the host server determines an occurrence (or frequency) weight for the interest category based on, for example, the number of times the keyword has occurred in the recent past. Interest categories that occur frequently will have higher scores than interest categories that occur less frequently. Accordingly, more content items related to those interest categories that occur frequently will be selected for the user's content feed. Lastly, at step 1020, the host server combines the scores to determine a total score. In some embodiments, the total score may also be normalized for purposes of selecting correct proportions.

Figure 11:
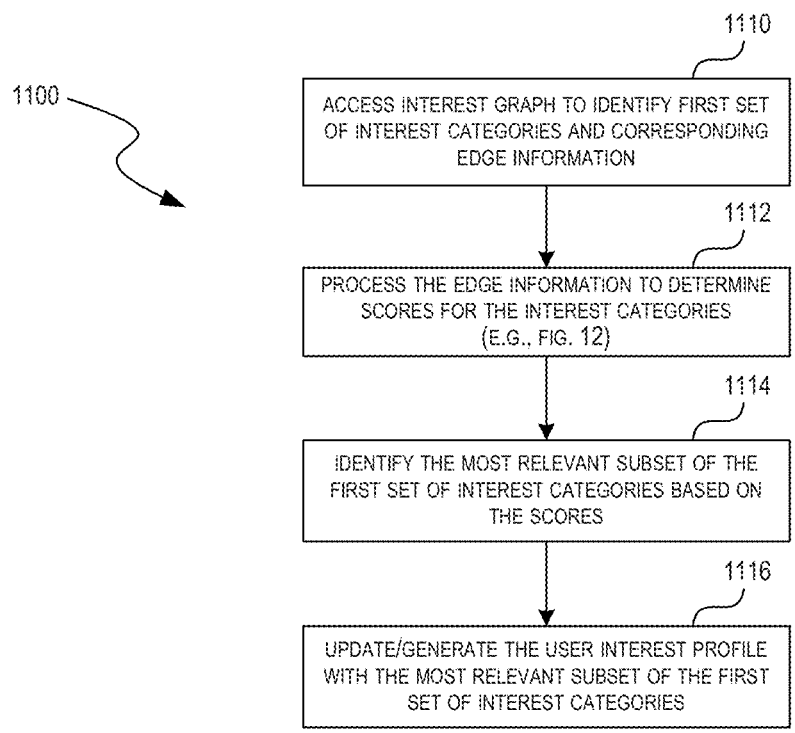
FIG. 11 depicts a flowchart illustrating an example process for updating or generating a user interest profile.

FIG. 11 depicts a flowchart illustrating an example process 1100 for updating or generating a user interest profile, according to an embodiment. The operations illustrated with respect to FIG. 11 may be performed in various embodiments by a host server of FIG. 1, one or more processors, and/or other modules, engines, components or tools discussed herein. Additional or fewer data flow operations are possible.

To begin, at step 1110, the host server accesses the interest graph with a particular user input to identify a first set of interest categories associated with the particular user and corresponding edge information. At step 1112, the host server processes the edge information to determine scores for the interest categories based on the edge information. An example of this process is shown and discussed in further detail with reference to FIG. 12.

At step 1114, the host server identifies the most relevant subset of the first set of interest categories based on the scores. For example, as discussed above, the top 20 keywords can be selected based on the total scores determined in FIG. 12. Lastly, at step 116, the host server updates and/or generates the user interest profile for the particular user with the most relevant subset of the first set of interest categories.

Figure 12:
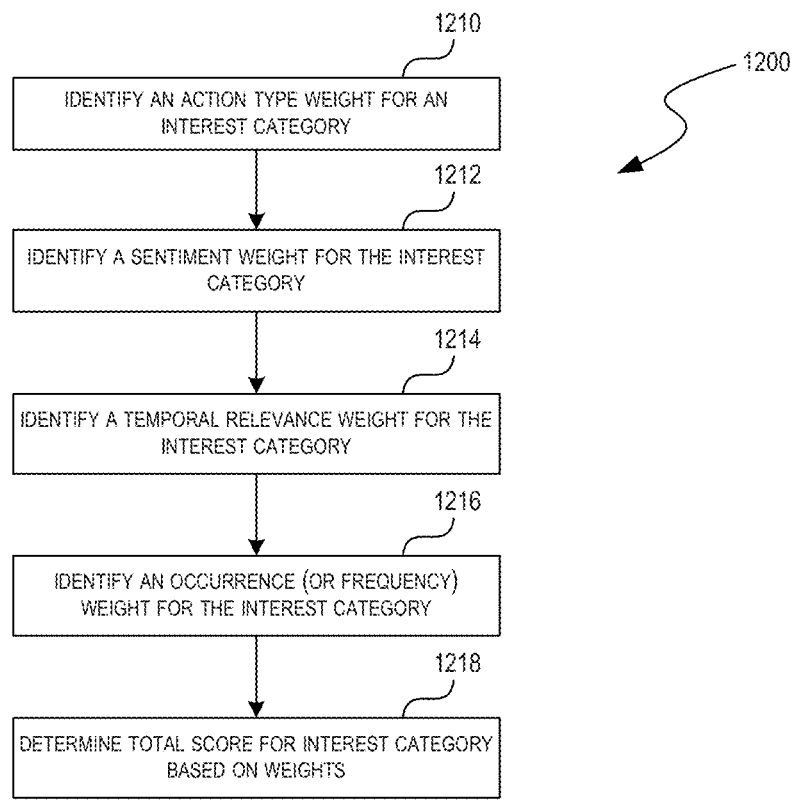
FIG. 12 depicts a flowchart illustrating an example process for processing edge information to identify weights and/or determine total scores for interest categories associated with particular users.

FIG. 12 depicts a flowchart illustrating an example process 1200 for processing the edge information to identify weights and/or determine total scores for interest categories associated with particular users, according to an embodiment. The operations illustrated with respect to FIG. 12 may be performed in various embodiments by a host server of FIG. 1, one or more processors, and/or other modules, engines, components or tools discussed herein. Additional or fewer data flow operations are possible.

To begin, at step 1210, the host server identifies from the edge information the action type weight for the interest category based on a type of user action taken by the specific user on the content item with which the interest category was derived. For example, the user may have posted, reposted, clicked on, etc. the content item having the associated interest category. Each user action (e.g., posted, reposted, clicked, etc.) can have a different weight that is associated with the interest category. At step 1212, the host server identifies from the edge information a sentiment weight for the interest category based on a sentiment associated with the content item and/or a sentiment associated with the action. For example, when a user posted the content item, the user could have attached a corresponding sentiment (e.g., happy, sad, etc). Examples of the various sentiments are shown and discussed in greater detail with reference to FIG. 6.

At step 1214, the host server identifies from the edge information the temporal relevance weight for the interest category based on the time of the user action. For example, the number of days since the action occurred can be taken into account when determining the relevance of interest categories. In one embodiment the temporal relevance can be determined from an equation that decreases as the number of days since the action occurred increases (e.g., temporal relevance=1/log(C+D), where C is a predetermined constant and D is the days since the action occurred).

At step 1216, the host server identifies from the edge information the occurrence (or frequency) weight for the interest category based on, for example, the number of times the keyword has occurred in the recent past. Interest categories that occur frequently will have higher scores than interest categories that occur less frequently. Accordingly, more content items related to those interest categories that occur frequently will be selected for the user's content feed. Lastly, at step 1218, the host server combines the weights/scores to determine a total score. In some embodiments, the total score may also be normalized for purposes of selecting correct proportions.

Computer System Overview

Figure 13:
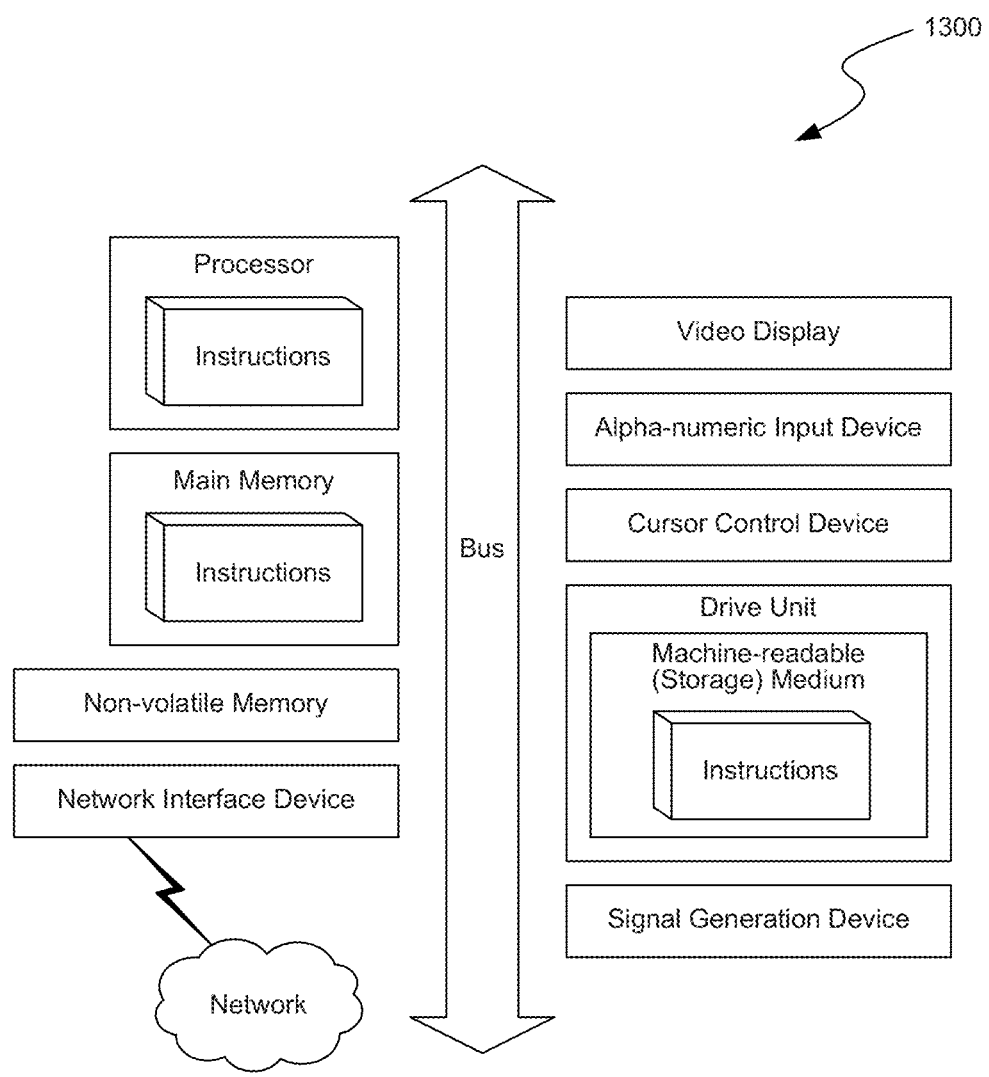
FIG. 13 depicts a diagrammatic representation of a machine in the example form of a computer system within which a set of instructions, for causing the machine to perform any one or more of the methodologies discussed herein.

FIG. 13 shows a diagrammatic representation of a machine in the example form of a computer system 1300, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMs), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

What is claimed is:

1. A method comprising:
   generating, by a computer system, a first plurality of user interest categories, wherein at least some of the first plurality of user interest categories are determined based on action performed on one or more of a plurality of content items in a social networking system by a specific user;
   determining a score of each of the first plurality of user interest categories, wherein determining the score includes:
      identifying an action type weight associated with each of the first plurality of user interest categories, wherein different types of action performed on the one or more of the plurality of content items have different weights,
      identifying a sentiment weight associated with each of the first plurality of user interest categories, wherein different types of sentiments associated with the one or more of the plurality of content items have different weights, and
      identifying a temporal relevance weight associated with each of the first plurality of user interest categories, wherein the score of each of the at least some of the first plurality of user interest categories are determined based on the action type weight, the sentiment weight and the temporal relevance weight of the corresponding interest category; and
   identifying, by the computer system, two or more of:
      a first quantity of content items of the plurality of content items based on a user interest profile associated with the specific user, wherein the user interest profile includes a subset of a first plurality of interest categories in which the specific user has indicated an interest, the subset selected based on the scores of the first plurality of interest categories;
      a second quantity of content items of the plurality of content items based on a second plurality of interest categories in which other users of the social networking system have indicated an interest, the other users having one or more characteristics that are the same or similar to the specific user, the second plurality of interest categories being different from the first plurality of interest categories;
      a third quantity of content items of the plurality of content items randomly; and
   populating, by the computer system, a content feed for the specific user by selecting at least one content item from the two or more of the first quantity of content items, the second quantity of content items, and the third quantity of content items, wherein a number of content items selected from the second quantity of content items or the third quantity of content items is determined based on a number of content items selected from the first quantity of content items;
   receiving an indication to populate the content feed for the specific user of the social networking system; and
   responsively providing the content feed for presentation to the specific user.

2. The method of claim 1, further comprising:
   receiving an indication that the specific user performed an action on a first content item;
   processing the first content item to identify first interest categories associated with the first content item, wherein at least one of the first interest categories is a new interest category not already included in the first set of interest categories in which the specific user has indicated an interest; and
   adding the new interest categories to the first set of interest categories.

3. The method of claim 2, wherein processing the first content item to identify first interest categories comprises:
   extracting one or more keywords associated with the first content item, wherein each interest category in the social networking system is represented by a keyword.

4. The method of claim 3, wherein processing the first content item to identify first interest categories further comprises:
   comparing the keywords to existing keywords representing existing interest categories of the first set of interest categories to identify new keywords, wherein the new keywords represent the new interest categories associated with the first content item.

5. The method of claim 3, further comprising:
   determining one or more weights associated with a first keyword of the one or more keywords associated with the first content item, wherein the one or more weights together indicate a measure of the specific user's interest in a particular interest category represented by the first keyword.

6. The method of claim 5, further comprising:
   identifying an action type associated with the action performed on the first content item, wherein at least one of the one or more weights associated with the first new keyword of the new keywords is based on the action type.

7. The method of claim 6, wherein the action type comprises one of: a click, a post, or a react.

8. The method of claim 5, further comprising:
accessing an interest graph from computer memory, wherein the interest graph includes a plurality of interest categories each interconnected with one or more of a plurality of users of the social networking system by edges; and
updating the interest graph by:
identifying a first edge between the specific user and the first keyword; and
associating edge information with the first edge, wherein the edge information indicates the one or more weights associated with the first keyword.

9. The method of claim 5, further comprising:
identifying a sentiment associated with the first new keyword, wherein at least one of the one or more weights associated with the first new keyword of the new keywords is based on the sentiment.

10. The method of claim 3, further comprising:
processing the keywords associated with the first content item to identify a related keyword.

11. The method of claim 10, further comprising:
determining one or more weights associated with the related keyword, wherein the one or more weights together indicate a measure of the specific user's interest in a particular interest category represented by the related keyword.

12. The method of claim 1, further comprising:
accessing an interest graph from computer memory to identify the first set of interest categories and edge information corresponding to the first set of interest categories;
processing the edge information corresponding to the first set of interest categories to determine a score for each interest category, wherein each score indicates the specific user's measure of interest in the corresponding interest category; and
identifying the subset of the first set of interest categories based on the scores.

13. The method of claim 12, wherein the interest graph includes a plurality of interest categories and each of the plurality of interest categories is interconnected with one or more of a plurality of users of the social networking system by edges, and wherein each of the plurality of edges have edge information including one or more weights that together indicate the measure of user interest in the corresponding interest category.

14. The method of claim 1, wherein said identifying the first quantity of content items comprises:
processing the plurality of content items to identify content items that match one or more of the subset of the first set of interest categories.

15. The method of claim 1, further comprising:
identifying the other users having the one or more characteristics that are the same or similar to the specific user by identifying users of the social networking system having one or more interest categories in common with the specific user.

16. A method comprising:
accessing, by a processor, an interest graph from computer memory to identify various edge information associated with a specific user of a plurality of users of a social networking system, wherein the interest graph includes a plurality of interest categories each interconnected with one or more of the plurality of users by edges, and wherein each edge has edge information including one or more weights that together indicate a measure of user interest in the interest category;
processing the edge information to identify first content items and second content items, the first content items identified using a first set of interest categories and the second content items identified using a second set of interest categories, wherein the specific user has indicated an interest in the first set of interest categories, and wherein other users of the social network system have expressed an interest in the second set of interest categories, the other users having one or more characteristics that are similar to the specific user, the second set of interest categories being different from the first set of interest categories, wherein the first set of interest categories is a subset of a first plurality of user interest categories in which the specific user has indicated an interest, wherein the first set of interest categories is identified by:
determining a score of each of the first plurality of user interest categories based on an action type weight, a sentiment weight and a temporal relevance weight of each of the first plurality of user interest categories, wherein different types of action performed on one or more of a plurality of content items in the social networking system have different action type weights, wherein different types of sentiments associated with the one or more of the plurality of content items have different sentiment weights, and
selecting the first set of interest categories based on the scores of the first plurality of interest categories;
identifying third content items based on a random set of interest categories;
populating a content feed for the specific user utilizing the first content items, the second content items, and the third content items, wherein a number of the second content items or the third content items populated in the contend feed is determined based on a number of the first content items populated in the content feed;
receiving an indication to populate the content feed for the specific user of the social networking system; and
responsively providing the content feed for presentation to the specific user.

17. The method of claim 16, further comprising:
receiving an indication that the specific user performed an action on a first content item;
processing the first content item to extract keywords associated with the first content item, wherein each interest category in the social networking system is represented by a keyword;
comparing the keywords to existing keywords representing existing interest categories of the first set of interest categories to identify new keywords, wherein the new keywords represent the new interest categories associated with the first content item; and
adding the new keywords representing the new interest categories to the first set of interest categories.

18. A system comprising:
one or more processors; and
a storage device having computer-readable instructions stored thereon, the instructions, when executed by the one or more processors, cause the one or more processors to:
generate a first plurality of user interest categories, wherein at least some of the first plurality of user interest categories are determined based on action performed on one or more of a plurality of content items in a social networking system by a specific user;

determine a score of each of the first plurality of user interest categories, wherein determining the score includes:
- identifying an action type weight associated with each of the first plurality of user interest categories, wherein different types of action performed on the one or more of the plurality of content items have different weights,
- identifying a sentiment weight associated with each of the first plurality of user interest categories, wherein different types of sentiments associated with the one or more of the plurality of content items have different weights, and
- identifying a temporal relevance weight associated with each of the first plurality of user interest categories, wherein the score of each of the at least some of the first plurality of user interest categories are determined based on the action type weight, the sentiment weight and the temporal relevance weight of the corresponding interest category;

identify a first quantity of content items of the plurality of content items based on a user interest profile associated with the specific user of the social networking system, wherein the user interest profile includes a subset of the first plurality of interest categories in which the specific user has indicated an interest, the subset selected based on the scores of the first plurality of interest categories;

identify a second quantity of content items of the plurality of content items based on a second plurality of interest categories in which other users of the social networking system have indicated an interest, the other users having one or more characteristics that are the same or similar to the specific user, the second plurality of interest categories being different from the first plurality of interest categories;

identify a third quantity of content items of the plurality of content items randomly; and populate a content feed for the specific user by selecting at least one of each of the first quantity of content items, the second quantity of content items, and the third quantity of content items, wherein a number of content items selected from the second quantity of content items or the third quantity of content items is determined based on a number of content items selected from the first quantity of content items; and an interface configured to receive an indication to populate a content feed for a specific user of a plurality of users of a social networking system, and responsively provide the content feed for presentation to the specific user.

19. A system comprising:
- means for receiving an indication to populate a content feed for a specific user of a plurality of users of a social networking system and responsively providing the content feed for presentation to the specific user;
- means for generating a first plurality of user interest categories, wherein at least some of the first plurality of user interest categories are determined based on action performed on one or more of a plurality of content items in the social networking system by the specific user;
- means for determining a score of each of the first plurality of user interest categories, wherein the score of each of the at least some of the first plurality of user interest categories are determined based on an action type weight, a sentiment weight and a temporal relevance weight associated with each of the first plurality of user interest categories, wherein different types of action performed on the one or more of the plurality of content items have different action type weights, wherein different types of sentiments associated with the one or more of the plurality of content items have different sentiment weights;
- means for identifying a first quantity of content items of a plurality of content items based on a user interest profile associated with the specific user of the social networking system, wherein the user interest profile includes a subset of the first plurality of interest categories in which the specific user has indicated an interest, the subset selected based on the scores of the first plurality of interest categories;
- means for identifying a second quantity of content items of the plurality of content items based on a second plurality of interest categories in which other users of the social networking system have indicated an interest, the other users having one or more characteristics that are the same or similar to the specific user, the second plurality of interest categories being different from the first plurality of interest categories and wherein the specific user has not indicated interest in the second plurality of interest categories;
- means for identifying a third quantity of content items of the plurality of content items randomly;
- means for selecting at least one of each of the first quantity of content items, the second quantity of content items, and the third quantity of content items;
- means for populating a content feed for with the selected content items;
- means for receiving an indication to populate a content feed for a specific user of a plurality of users of a social networking system, and providing the content feed for presentation to the specific user.

* * * * *